3,717,386
BRAKE DEVICE PARTICULARLY FOR HYDRAULIC HAND BRAKES ON RAILROAD CARS
Kurt Axel Henry Edmansson, and Åke Gustav-Adolf Karlsson, Jonkoping, Sweden, assignors to Saab-Scania Aktiebolag, Linkoping, Sweden
Filed Nov. 3, 1970, Ser. No. 86,561
Claims priority, application Sweden, Nov. 3, 1969, 14,998/69
Int. Cl. B60t 17/16
U.S. Cl. 303—89        4 Claims

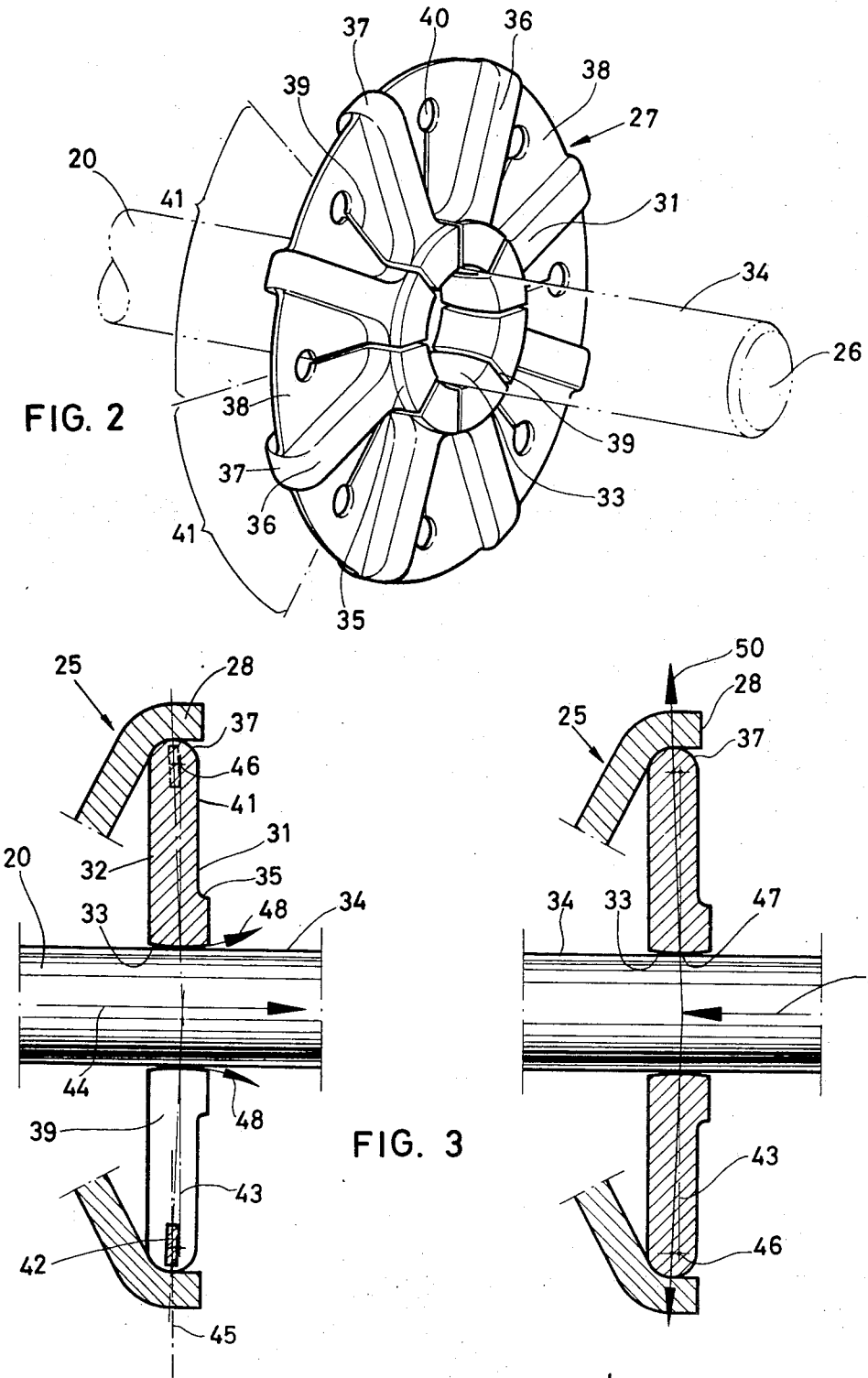

ABSTRACT OF THE DISCLOSURE

An endwise slidable rod, such as a brake rod, is releasably locked against sliding in one direction by a disc-like annular catch coaxially surrounding the rod and having its periphery engaging an annular seat that holds the catch against bodily axial displacement. The catch is frustoconical, converging in the opposite direction and has slits radial to its central aperture, defining spring segments that frictionally engage the rod. A sleeve around the rod, hydraulically actuatable in said opposite direction, disengages the spring segments from the rod to release the rod for movement in said one direction.

---

This invention relates to a brake device, particularly for hydraulic hand brakes on railroad cars comprising a primary activating means which can be set in two opposite directions corresponding to the brake being rendered operative resp. inoperative and which has a connection with a power exerting means arranged to axially displace, when the brake is rendered operative, a rod cooperating with the braking elements of the brake, so that these are set, and a locking device for the rod adapted to retain the rod by mechanical engagement with an external surface on the rod and by this retain the braking elements in a braking position, the engagement of the locking device being releasable, preferably in a hydraulic way, under the action of the primary activating means so that when the brake shall be rendered inoperative the rod can return and the braking elements be released.

A hand brake for railway cars is usually so constructed that upon activation it causes a setting of the ordinary brake shoes, and it is used preferably when a train of cars is placed at a railway station or occasionally is standing still out on the tracks. The hand brake alone must be able to warrant the braking action since the ordinary braking system cannot be reckoned with to be effective in such situations. Accidents have occurred with runaway cars or trains of cars indicating that existing hand brakes do not wholly satisfy the demands which must be made upon them for reasons of safety.

Hydraulically acting hand brakes have come into use which have partly replaced the solely mechanical type having toothed gear and chain transmission, and which have obvious advantages over them with respect to installation and handling, the latter among others in that it is easier to provide a sufficient braking force adapted to the need. In brake devices of the hitherto known kind the locking device, which after the setting of the brake is intended to retain the rod cooperating with the braking element, has not been of a satisfactory construction. Such a known mechanism comprises a screw spindle connected to the rod, which spindle allows, when moving in the setting direction, a lock nut to rotate on it under axial relative movement while at return movement of the rod and the spindle the nut is clamped against a conical seat in the housing so that the spindle is locked. The unlocking occurs hydraulically by means of a plunger which urges the conical surface of the locking nut to release from the seat. There are other locking mechanisms where the braking rod passes an eccentrically mounted arm which extends crosswise of the rod and has a hole somewhat larger than the rod. By means of a spring the arm is held in such a position that the edges of the hole engage the surface of the rod at two axially spaced and diametrically opposed points. If the rod after the setting movement—which is allowed by the arm—tries to return, the two edges of the hole will pinch the rod. The unlocking can here also occur hydraulically. In this construction there is the evident risk that the surface of the rod or of the edges of the hole will be worn so that the arm no longer safely retains the rod with the result that the brake can be released.

The object of the invention is to provide a locking device which compared with those hitherto in use is more simple and reliable and with which locking occurs directly against the bar in a way that enables an increased locking force—and by this less risk for an inadvertent release of the brake—but yet does not subject the surface of the bar to wear but enables a long length of life. The device is also such that the accuracy of measurement which is required to make the brake device highly reliable can be obtained by simple machining methods.

This is obtained according to the invention in that the locking device has the shape of a disk surrounding the rod which disk extends in radial direction to a seat that is concentric with the rod and has a plurality of circumferentially spaced portions that are resilient in relation to each other and each of which engages from its radial direction by means of the seat as support the external surface of the rod along a transverse plane that, seen in the setting direction of the rod, is positioned somewhat ahead of the plane in which the portions engage the seat, and which portions by means of a sleeve like means is applied behind the disk and can be axially displaced against the disk by the primary activating means, is swingable forwardly out of engagement with the external surface so that the disk allows the rod to be displaced forwardly but by clamping action from all their radial directions prevents the rod from returning until the disk is activated by the sleeve like means.

The invention will be more fully explained with reference to the accompanying drawings showing an embodiment of a hand brake adapted for railroad cars and in which FIG. 1 is a sectional view showing the main parts of the hand brake and in simplified form hydraulic connections there between.

FIG. 2 is a perspective view of the locking device of the hand brake.

FIG. 3 is a sectional view showing the locking device in two different stages of operation.

Figure 1:
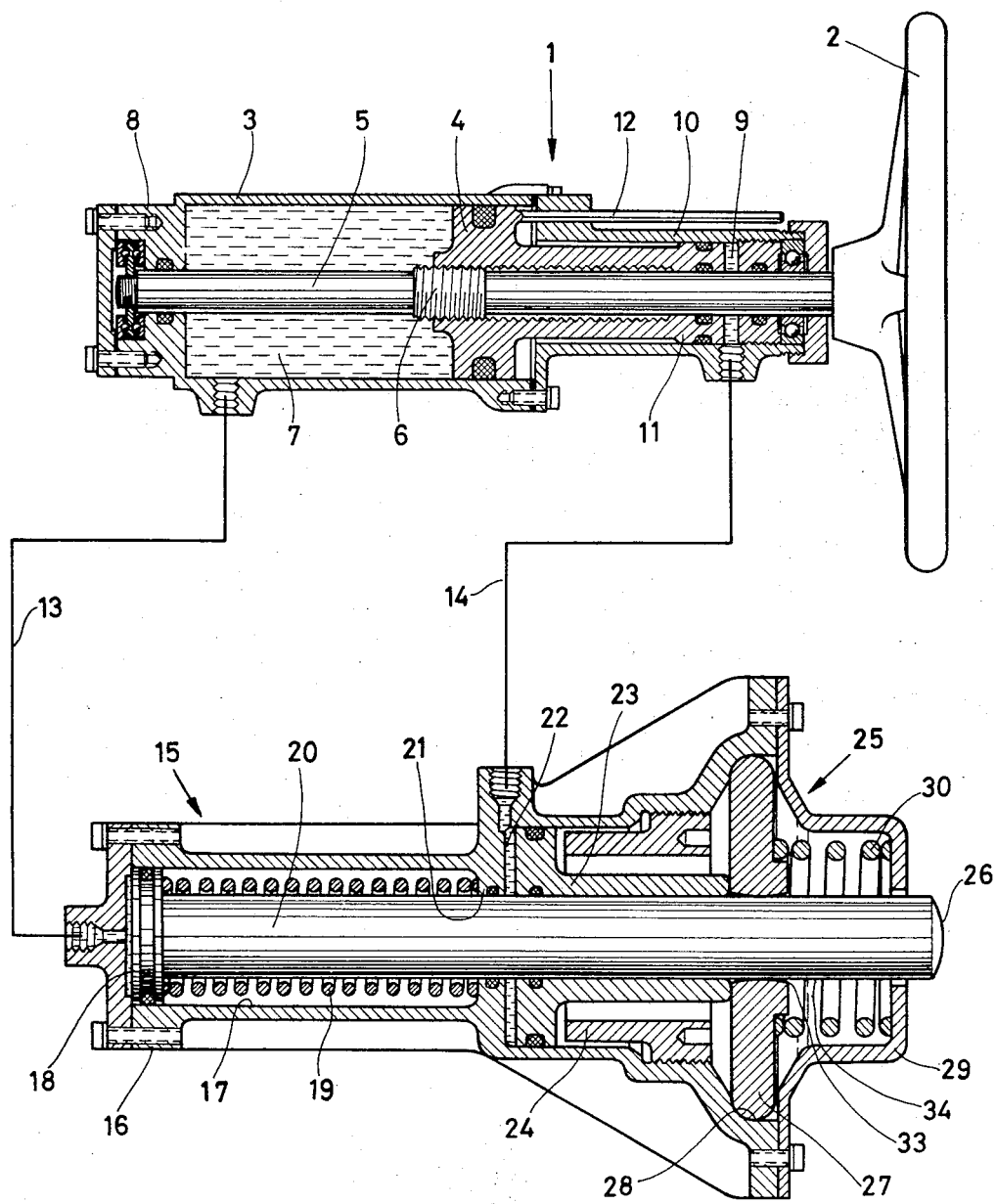

In FIG. 1 the numeral 1 designates the primary activating means of the hand brake which can consist of a pump operable by means of a manual control 2 and comprising a cylindrical casing 3 and an axially movable pump plunger 4 therein through which a spindle 5 of the control extends that can move the plunger fore and aft in the casing by means of threads 6. The pump has two liquid chambers one 7 of which is confined by the pump plunger and an end wall 8, where the spindle 5 is non-slidably carried. The other liquid chamber 9 is located on the opposite side of the plunger and is formed between a cylindrical wall 10 that comprises part of the cover of the pump casing and a rear extension 11 of the pump plunger sealingly inserted in the cover. The pump plunger is held against rotation relative to the casing 3 by means of a pin 12 extending through the cover and also serving to indicate the position of the plunger in the casing.

The activating means 1 is connected to a line system which is diagrammatically shown in the figure as two connections lines 13 and 14 which communicate with the chambers 7 resp. 9 of the pump casing and the first mentioned of which leads to a power exerting means 15. This consists of a hydraulic servo comprising a cylinder 17 formed in a housing 16 and having a working piston 18 sealingly fitted therein and adapted to be actuated on one side by the liquid pressure from the activating means 1 while on the other side of the plunger a return spring 19 acts tending to retain the working piston in the position shown in the drawing. The working piston is arranged on a piston rod 20 which projects out of the cylinder 17 through a guide 21 and a chamber 22 filled with a liquid and having therein a sleeve like means 23. This sleeve means can be axially displaced on the piston rod to engagement with a stop 24 under the action of the liquid pressure in the connection line 14.

Axially outside the sleeve means there is the locking device 25 of the brake through which passes the piston plunger 20 or a part connected therewith having circular or polygonal cross section. At its end 26 that is outside the locking device the rod is connected to the brake system (not shown) of the railroad car so that the braking elements acting on the wheels of the car can be set by displacing the rod to the right. The locking device comprises a disk 27 which is transversely located relative to the rod and at its circumference fits in a seat 28, positioned concentric with the rod and machined to accurate diameter in an enlargement of the housing 16 or in another fixed part to which the disk is axially secured by means of a cover 29. A compression spring 30 located within the cover acts on the axially outer side 31 of the disk while the inside 32 of the disk is actuatable in the setting direction of the rod 20 by the end surface of the means 23. In its central part the disk has a hole whose surface 33 in longitudinal section of the device is formed as a curved, convex profile and is accurately machined so as to fit the external surface 34 of the rod.

How the locking disk 27 can be formed appears more fully from FIG. 2. In a circular piece of carbon steel manufactured e.g. by drop forging there are provided a number of excavations in the axially outer side 31 where the surface 35 forms a guide for the compression spring 30, as well as in the inside 32 so that the material of the disk is considerably diminished while the material between the excavations forms bars 36 which can be considered as rigid in radial direction and which are oriented starlike around the rod 20. The bars are all of equal length as measured from the surface 33 of the hole to the rounded outer contour 37 engaging the seat 28. The circumferential parts 38 positioned between the bars have a somewhat inwardly offset edge which is spaced from the seat 28 as shown in the figure.

The material of the disk is divided in circumferential direction by means of radial cuts 39 located between the bars and intersecting the wall 33 of the hole and the main portion of the thin disk parts. The cuts can suitably be made by slitting by means of a side-milling cutter after the disk is otherwise finished, and to facilitate this a hole 40 can be made in the outer portion of the periphery parts 38 before the milling. Each cut can thus be regarded as a radially elongated keyhole-shaped slot that opens radially toward the disk axis and has its enlarged end, defined by the hole 40, remote from that axis. After the slitting the disk will consist of a number of individually springing portions 41 having sector shape and each of which comprises a rigid bar 36 which is connected with adjacent bars through the remaining thin material outwardly of the holes 40 as illustrated more fully in the left part of FIG. 3 where the material is sectioned and designated by 42. The portions have thus an individual capability to swing lengthwise of the rod 20, the swinging center being located near the circumference of the disk, and since the material 42 forms a yielding section no substantial force is required for the springing movement but the disk can easily be dishlike recurved under elastic deformation of the yielding section.

More specifically, as will be apparent from a consideration of FIGS. 2 and 3 taken together, the axis of swinging motion of each bar 36 coincides with the geometrical axis of its semicyclindrically rounded outer end surface 37. That axis, extended, lies in the reduced-thickness plate-like segments 38 of the disk at each side of the bar. Note that the swinging axes of two circumferentially adjacent bars intersect at a point in the thin material that is in line with a slit 39 but radially outward of the hole 40 at the end of the slit. As a result, the thin connecting portions 42 that are midway between bars have their torsion centers located at the points just described. As the bars swing in unison about their swinging axes, tension stresses are developed that are at a maximum around the edge of each hole 40 and compression stresses are developed that are at a maximum around the radially outer circumferentially extending edge of each reduced thickness portion. It will be apparent that the neutral axis of this stress pattern is at or very close to the swinging axes of the bars. Because there are no areas of inherently high stress concentration in the disk, and even the maximum stresses are relatively low, the disk is virtually immune to fatigue and thus has a much longer useful life than prior lock devices intended for the same purpose.

More specifically, as will be apparent from a consideration of FIGS. 2 and 3 taken together, the axis of swinging motion of each bar 36 coincides with the geometrical axis of its semicyclindrically rounded outer end surface 37. That axis, extended, lies in the reduced-thickness plate-like segments 38 of the disk at each side of the bar. Note that the swinging axes of two circumferentially adjacent bars intersect at a point in the thin material that is in line with a slit 39 but radially outward of the hole 40 at the end of the slit. As a result, the thin connecting portions 42 that are midway between bars have their torsion centers located at the points just described. It will be apparent that the neutral axis of the stress pattern is at or very close to the swinging axes of the bars, so that there are no stress concentrations anywhere in the thin connecting portions 42, but only very low and relatively uniformly distributed torsion stresses. Because there are no areas of inherently high stress concentration in the disk, and even the maximum stresses are relatively low, the disk is virtually immune to fatigue and thus has a much longer useful life than prior lock devices intended for the same purpose.

As best appears from the left part of FIG. 3 the locking device with its disk portions 41 engages the surface 34 of the rod along a tranverse plane 43 which, seen in the setting direction 44 of the rod, is positioned somewhat ahead of the plane 45 where the outer contours 37 of the portions engage the seat 28. This is obtained by reason of the fact that the surface 33 surrounding the hole is lathed, at least in its narrowest part, by means of a form tool to an arched longitudinal section having the center of the arc offset axially outwardly from the axis of the semicylindrical bar surface 37. If the center of the arc is moved to the point 46 the tangent point 47 between the surfaces 33 and 34 will obviously, upon dishlike recurving of the disk, roll along the surface 34, and the outer contour 37 of the disk will rotate in the seat 28 without displacement of the point of engagement, and the result is that the tangent point 47 will remain in a constant declination forwardly of the point of engagement of each bar with the seat 28 even though in the free condition of the disk the surface 33 around the hole has not exactly the same diameter as that of the rod. The disk can therefore suitably be machined to a hole diameter that is somewhat below the diameter of the rod, which is advantageous in view of a certain inevitable wear during operation and the fact that the rod, when it is pushed through the hole of the disk during assembly has to move the wall parts 33 around the hole away from each other under outward springing motion of the portions 41 so that the locking device is prestressed against the rod. The mentioned declination can be about 3-5° i.e. smaller than the angle of friction at the point 47.

To explain the operation, it is first assumed that the brake device is in its inoperative condition according to FIG. 1 and that it is actuated by the hand wheel of the manual control in such a direction that the pump plunger is displaced forwardly in the casing 3. As a result, pressure fluid is transferred through the connection line 13 to the power exerting means 15 so that its working piston starts moving to the right, compressing the return spring 19. In this direction the rod 20 can move freely relative to the locking device 25 since the external continuous surface 34 on the rod easily slides through the hole of the disk 27 without being restrained by the resilient portions 41. Should the friction engagement between the surface of the rod and the wall of the hole be too large at the beginning this only causes such engaged portion or portions of the disk to be carried with the rod and swung forwardly in the direction indicated by the arrows 48 so that the hole is somewhat enlarged, whereupon the rod can unimpededly advance forwardly. The movable parts of the brake of the car which are to be activated are now displaced by the rod towards the braking position until the braking elements acting on the wheels are tightened by a suitable force corresponding to a certain pressure from the primary activating means 1.

If now the activating means is left in this condition it is obvious that the braking action which comes from the power exerting means 15 will not persist since the fluid pressure against the piston 18 can gradually decrease due to leakage, temperature changes etc. The locking device 25, however, now comes into effect to retain the rod 20 in its forwardly advanced position and by this preserve the braking action. As soon as the rod tends to retract, the surrounding portions 41 which are held in frictional engagement with the surface 34 by the compression spring 30 and the spring action of the disk will forcedly accompany the rod in its movement, the tangential point 47 tending to travel towards the plane 45 simultaneously as the rigid bars assume a somewhat more erected position relative to the rod. The engagement between the seat 28, the bars 36 and the surface 34 of the rod increases very rapidly and immediately upon a very short return movement the rod is clamped by the locking device from all directions. The action of the operation is diagrammatically illustrated in the right part of FIG. 3 where 49 designates the retraction force coming from the brake rod system while 50 designates the support pressure passing through the tangential points 47 and through the support points at the seat 28, which pressure due to the small declination, increases to a high value and, by this prevents the retraction of the rod. Thereby self-locking effect with the device the brake and locking position which thus generally coincide with one another can be attained at any point of the working stroke of the rod 20.

Release of the rod 20 can now only take place by displacing the resilient portions in the direction indicated by 48. This is done hydraulically in the example shown by actuating the manual control means 2 in a direction opposite to the setting direction. By this liquid from the cylinder 17 returns to the chamber 7 of the pump casing 3 whose volume now increases while the volume simultaneously decreases in the small liquid chamber 9 due to the movement of the extension 11 of the plunger to the right in the figure. The pressure increase is transmitted through the connection line 14 to the chamber 22 positioned near the locking device 25 and due to the relationship between the areas even a moderate turning moment on the hand wheel causes a liquid pressure that, by the axial action of the sleeve like means 23 on the axially inner side 32 of the resilient portions 41 of the locking device, is sufficient to release the latter from the surface 34 of the rod. The rod can now under the action from among others the return spring 19 return (to the left in the figure), the movable parts of the brake and the brake shoes being rendered inoperative.

Although the invention is described only in connection with hand brakes for vehicles it is evident that without departing from the characteristics of the invention it can also be utilized within other fields of application, such as in servos of control systems or working machines, in jacks or other power exerting transmission mechanisms where a fore and aft movable machine part has to be locked mechanically against motion in a certain direction at every point along a motion path of the machine part and where the locking shall remain during unlimited time and be releasable by action on the locking device in the opposite direction.

What is claimed as our invention is:

1. A locking device by which a rod can be releasably held against motion in one axial direction while remaining substantially free to move in the opposite direction, said locking device comprising:
    (A) a unitary disc-like member comprising
        (1) a plurality of radially extending bars which are circumferentially spaced from each other and thick enough to be substantially rigid, each of said bars having
            (a) its radially outer end portion formed as a surface that is curved about a swinging axis which is transverse to the axis of the disc and to the length of the bar, and
            (b) its radially inner end portion formed as a surface which is shaped in substantial conformity with the circumferential surface of a rod to be locked so that the inner end portions of the bars cooperate to define a hole in which the rod is closely receivable; and
        (2) thinner portions extending circumferentially between adjacent bars and connecting them, each of said thinner portions
            (a) being substantially on a plane which is transverse to the axis of the disc and which contains said swinging axes, and
            (b) being narrow, as measured radially of the disc, in a zone midway between the bars it connects and which zone is near the periphery of the disc, said narrow zones of the connecting portions affording resilience by which the radially inner ends of the bars are enabled to swing axially for dishing deformation of the disc-like member;
    (B) stationary annular means defining a seat in which said radially outer end portions of the bars are engaged and by which each bar is substantially confined to swinging motion about its said swinging axis; and
    (C) movable lock releasing means engageable with the radially inner end portions of all of the bars simultaneously to swing the bars in said opposite direction of rod motion and thus release the rod for motion in its first mentioned direction.

2. The locking device of claim 1, further characterized by:
the radially inner end portion of each bar being formed as a surface which is curved in the direction of the disc axis on a uniform radius that has its center near said swinging axis of the bar but spaced slightly therefrom in said opposite direction of rod motion, so that as the bar swings in response to movement of the rod in said opposite direction, the inner end surface of the bar tends to roll on the surface of the rod.

3. The locking device of claim 1, further characterized by:
said thinner portions of the disc-like member being joined to the bars along a major portion of the length of each bar and extending circumferentially toward the adjacent bars, there being a radially elongated keyhole-shaped slot in the thinner portion midway between each pair of bars, which slot has its enlarged end remote from the axis of the disc and defining the radially inner edge of said zone, and which slot opens inwardly toward the center of the disc so that the inner end portions of the bars can swing in said directions of rod movement independently of one another.

4. A locking device by which a rod can be releasably held against motion in one axial direction while remaining substantially free to move in the opposite direction, said locking device being of the type that comprises a unitary annular member which surrounds the rod, has its peripheral portion substantially confined against axial motion, and has radial slots that open inwardly and define sector-like portions the inner ends of which can swing independently of one another in said directions, said locking device being characterized by:

(A) each of said sector-like portions comprising a substantially rigid bar that extends radially all the way across the annular member from its central aperture, each of said bars
  (1) having its outer end portion formed as a trunnion surface which is curved about a swinging axis that extends transversely to the bar and to the axis of the annular member, and
  (2) having at its inner end a surface that conforms to the circumferential surface of the rod and is curved about an axis which is parallel to and near said swinging axis; and (B) said bars being connected by circumferentially extending web-like portions of the annular member disposed in a plane which contains said swinging axes, each of said web-like portions
  (1) having a radially outer edge spaced radially outwardly of the swinging axes of said bars, and
  (2) having a radially inner edge which is curved concavely inwardly and extends through a zone midway between circumferentially adjacent bars, the web portion being narrowest, as measured radially of the anular member, at said zone, said edge being continuous with other edge portions of the annular member that define said sector-like portions, and said edge being spaced radially inwardly of said swinging axes.

References Cited
UNITED STATES PATENTS

| | | | |
|---|---|---|---|
| 2,851,995 | 9/1958 | Westcott | 303—89 X |
| 2,988,058 | 6/1961 | Warnecke | 303—89 U X |
| 3,586,138 | 6/1971 | Engle | 188—265 |
| 3,597,016 | 8/1971 | Gachot | 303—89 |

DUANE A. REGER, Primary Examiner

U.S. Cl. X.R.

188—265